(12) United States Patent
Blood et al.

(10) Patent No.: US 9,801,436 B2
(45) Date of Patent: *Oct. 31, 2017

(54) WALKING/WADING STAFF WITH INTEGRAL FISHING NET

(71) Applicant: SILVER CREEK INNOVATIONS, LLC, Ashtabula, OH (US)

(72) Inventors: Jeffrey L. Blood, Cranberry Township, PA (US); Carl Caylor, Ashtabula, OH (US)

(73) Assignee: SILVER CREEK INNOVATIONS, LLC, Ashtabula, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/153,136

(22) Filed: Jan. 13, 2014

(65) Prior Publication Data

US 2014/0157650 A1    Jun. 12, 2014

Related U.S. Application Data

(63) Continuation-in-part of application No. 13/482,046, filed on May 29, 2012, now Pat. No. 8,631,810.

(60) Provisional application No. 61/520,209, filed on Jun. 6, 2011.

(51) Int. Cl.
| | |
|---|---|
| *A01K 77/00* | (2006.01) |
| *A45B 3/00* | (2006.01) |
| *A45B 1/00* | (2006.01) |
| *A45B 9/04* | (2006.01) |
| *A45B 9/00* | (2006.01) |

(52) U.S. Cl.
CPC .............. *A45B 3/00* (2013.01); *A01K 77/00* (2013.01); *A45B 1/00* (2013.01); *A45B 9/04* (2013.01); *A45B 2009/007* (2013.01)

(58) Field of Classification Search
CPC ...................................................... A01K 75/00
USPC ......................................... 135/65, 66; 43/1
See application file for complete search history.

(56) References Cited

U.S. PATENT DOCUMENTS

| | | | | |
|---|---|---|---|---|
| 1,258,632 | A * | 3/1918 | Harris | 43/12 |
| 1,742,550 | A * | 1/1930 | Mann | 43/12 |
| 2,457,922 | A * | 1/1949 | Robinson | 43/12 |
| 4,619,065 | A * | 10/1986 | Jones | 43/11 |
| 5,137,623 | A * | 8/1992 | Wall et al. | 210/238 |
| 7,124,533 | B2 * | 10/2006 | Kleckner | 43/11 |
| 7,269,921 | B2 * | 9/2007 | Lee | 43/12 |
| 2007/0204895 | A1 * | 9/2007 | Govero | 135/66 |
| 2012/0036758 | A1 * | 2/2012 | Steffens | 43/12 |

* cited by examiner

*Primary Examiner* — David R Dunn
*Assistant Examiner* — Danielle Jackson
(74) *Attorney, Agent, or Firm* — Vorys, Sater, Seymour and Pease LLP; Mark A. Watkins, Esq.

(57) ABSTRACT

A telescopic wading staff with a full size, integral fishnet is disclosed. The preferred embodiment includes a retractable, extensible pole that can be moved between a first, fully compacted (retracted) configuration for transport or storage and second, fully extended configuration for wading, especially when traversing a stream or riverbed for fly-fishing. Other embodiments include a hook extension from the lower staff end for retrieving tangled lines, lures and the like.

17 Claims, 7 Drawing Sheets

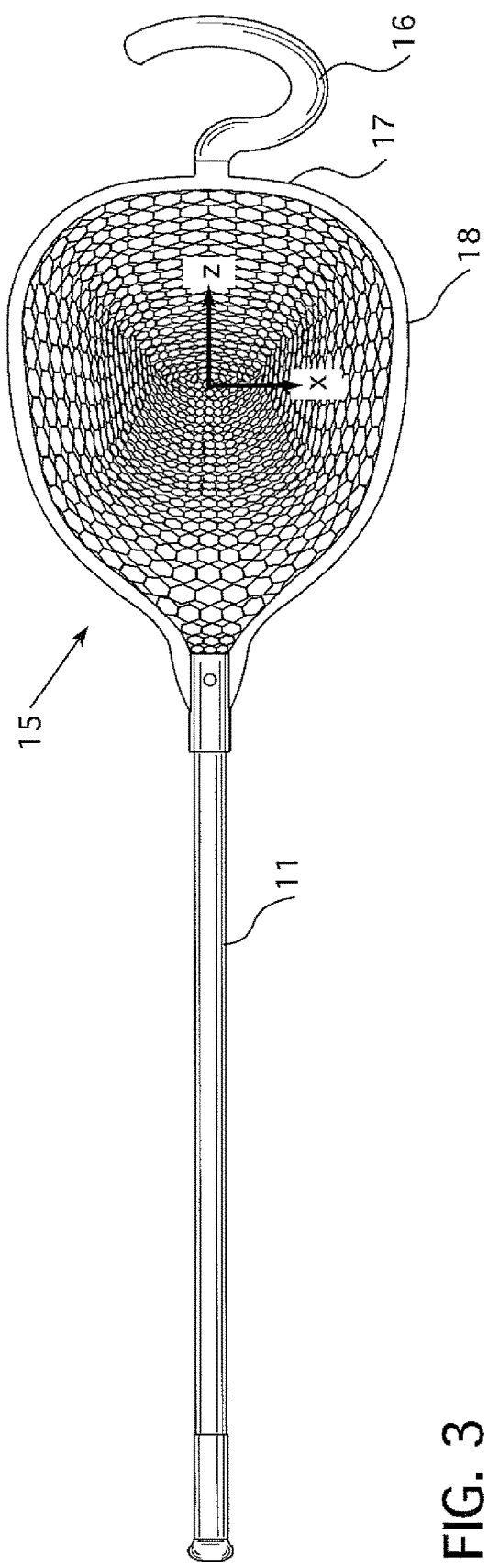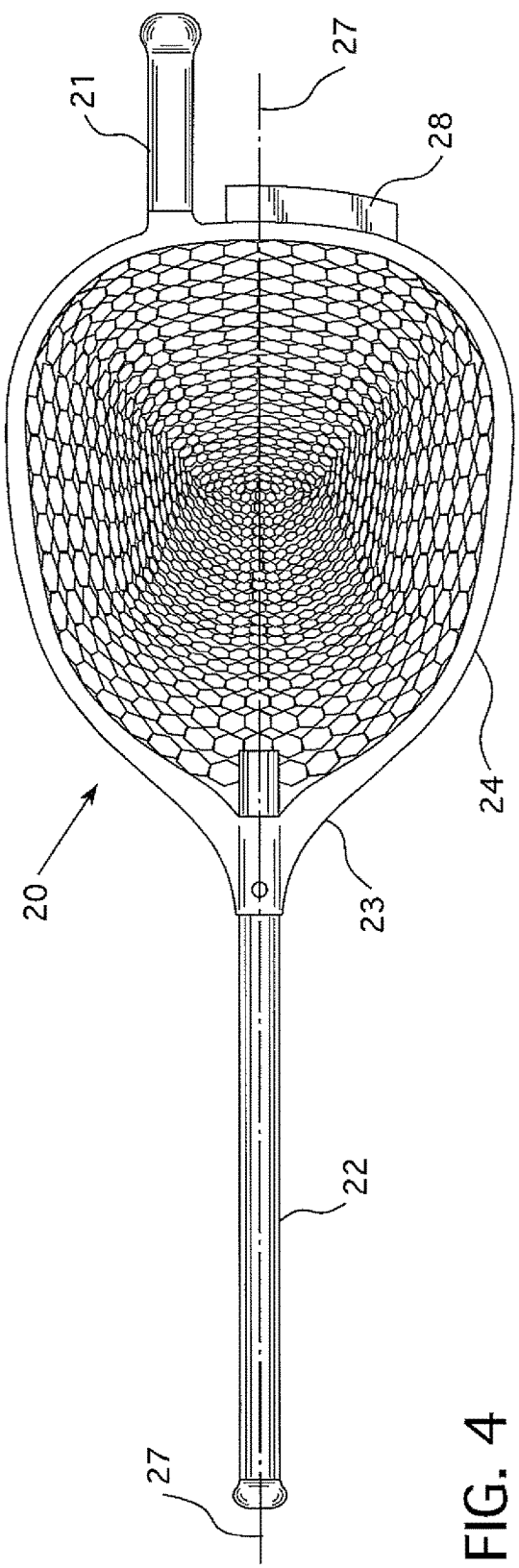
FIG. 3
FIG. 4

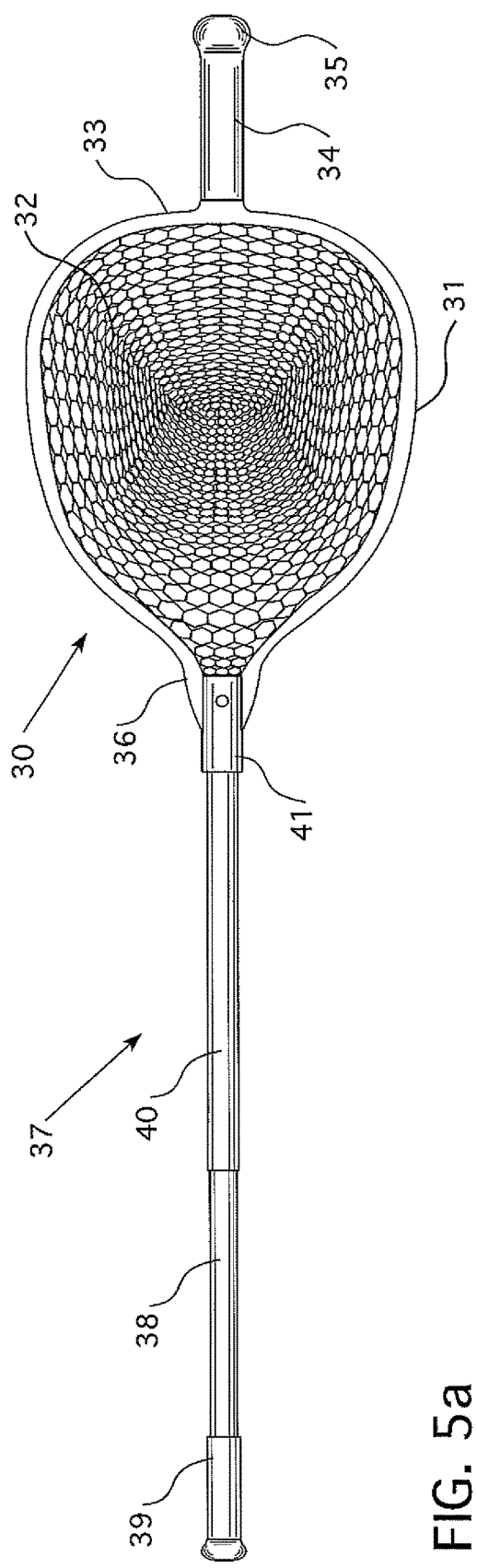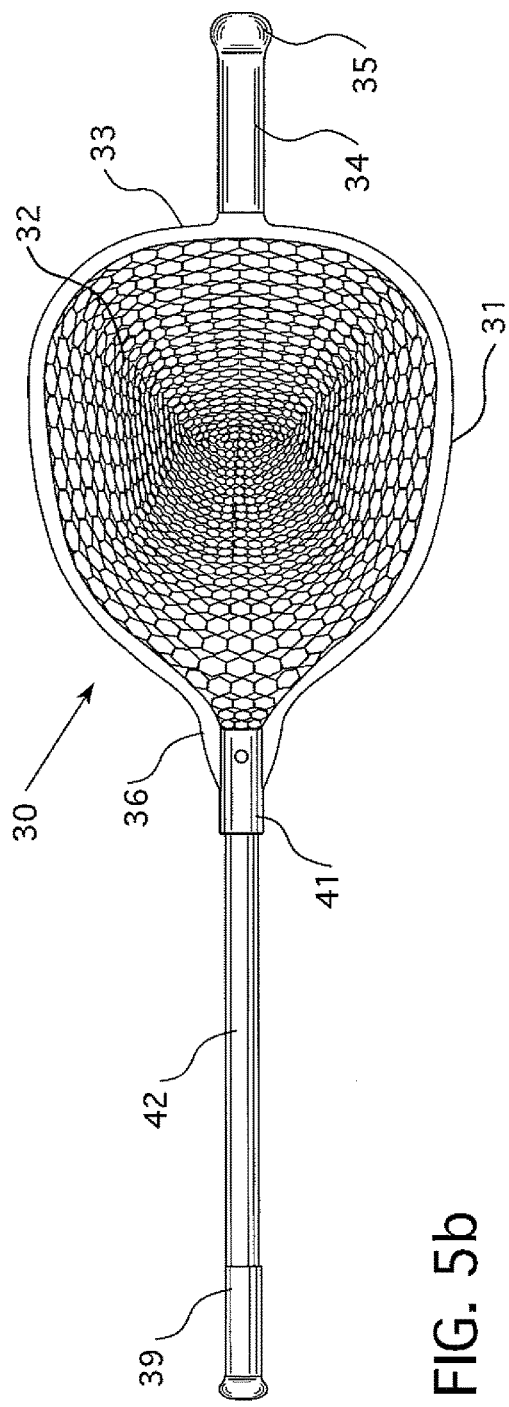
FIG. 5a
FIG. 5b

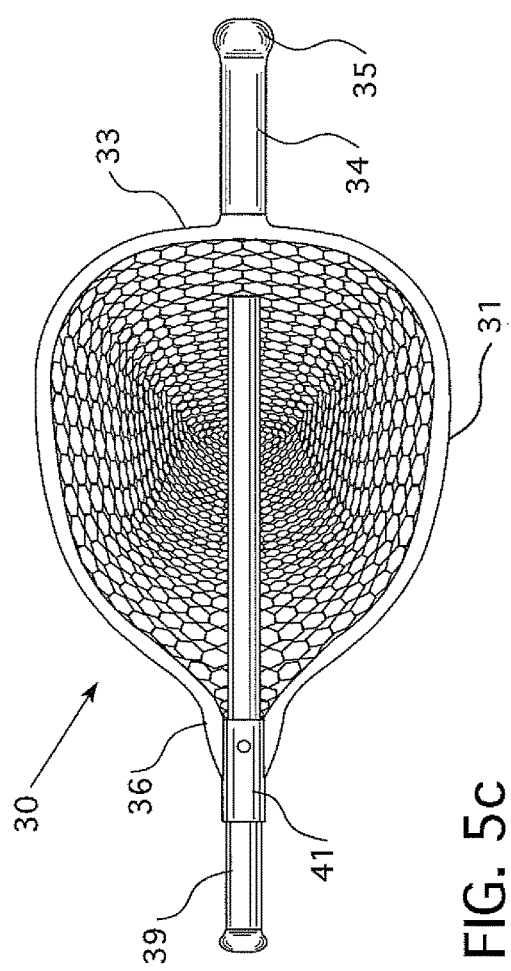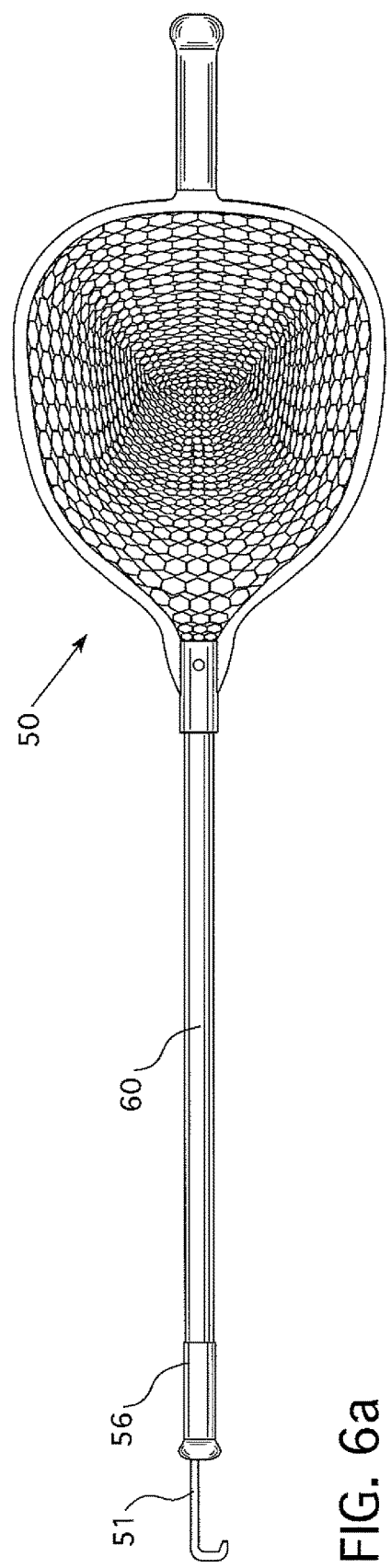
FIG. 5c
FIG. 6a

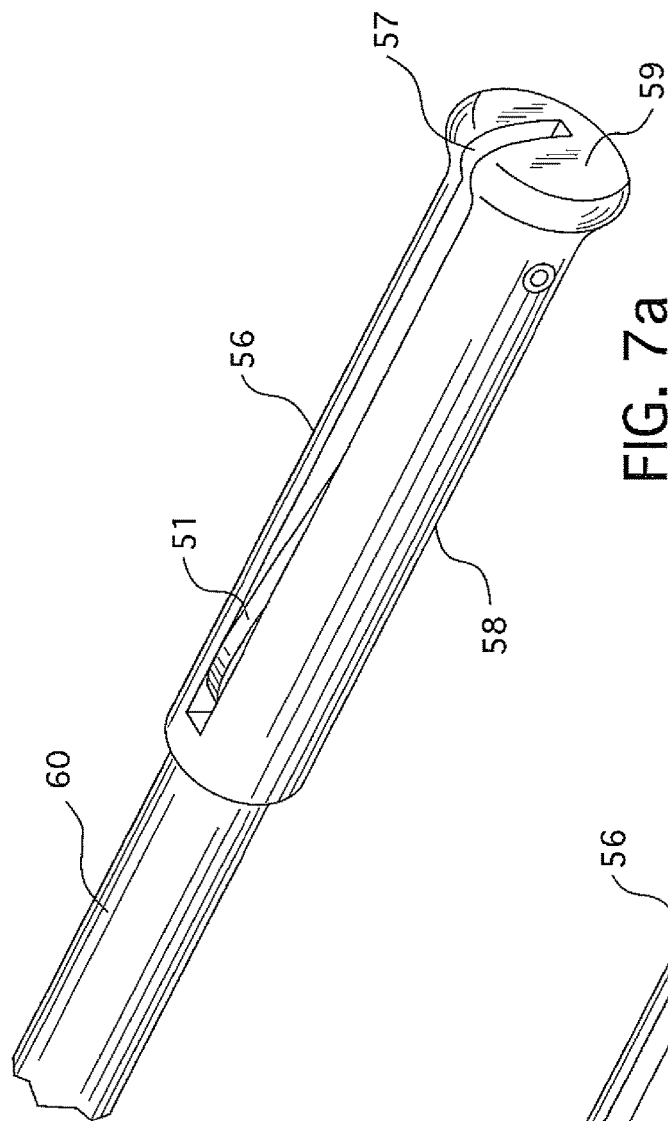
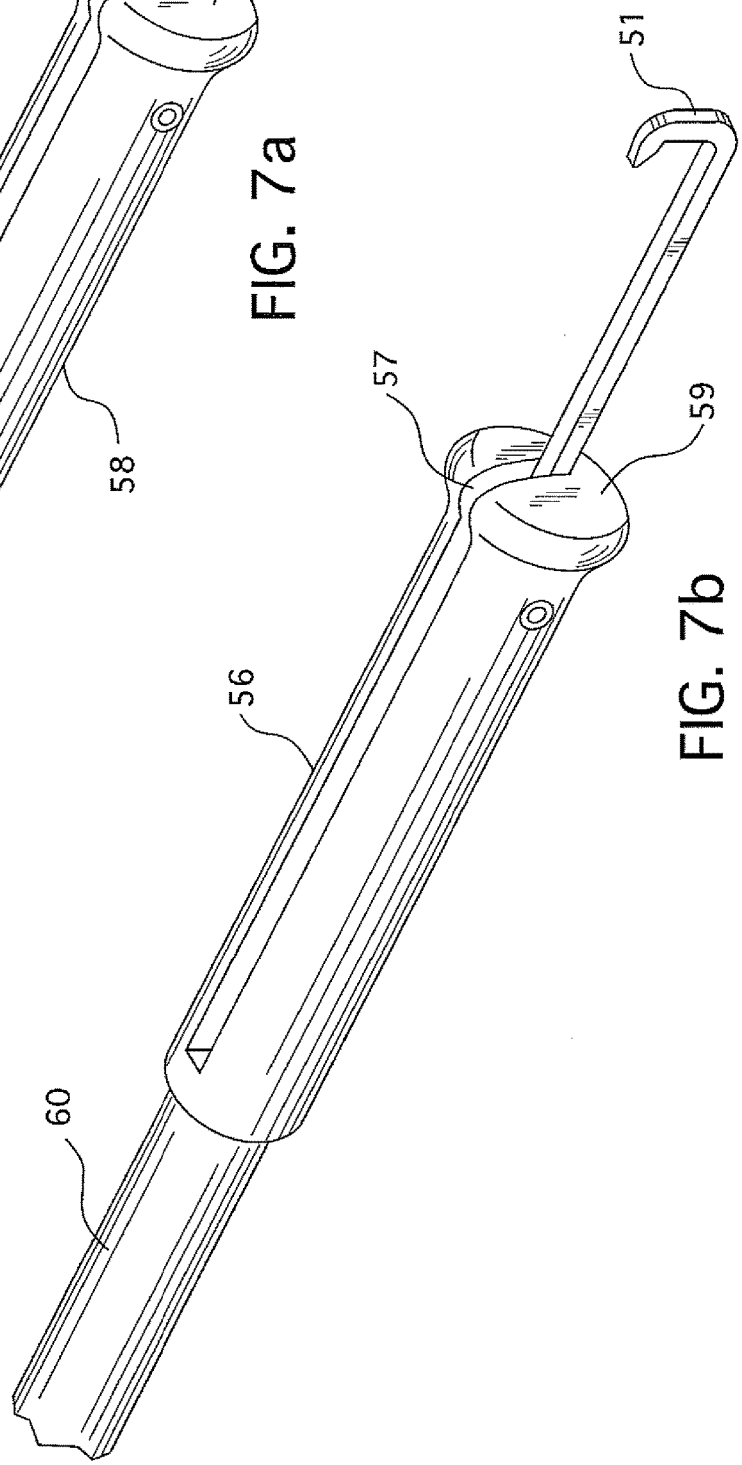
FIG. 7a
FIG. 7b

WALKING/WADING STAFF WITH INTEGRAL FISHING NET

This continuation-in-part application claims priority to U.S. non-provisional application Ser. No. 13/482046 filed May 29, 2012, which claims priority U.S. Provisional Patent Application Ser. No. 61/520,209 filed on Jun. 6, 2011, entitled WADING STAFF WITH INTEGRAL FISHING NET, the contents of which are incorporated by reference herein in its entirety.

BACKGROUND OF THE INVENTION

Field of the Invention

Disclosed is a device for sportsmen who want or need to use a walking staff to reach their favorite fishing spots, but are reluctant to use one because a walking staff would add another piece of equipment to the already numerous pieces of fishing gear to carry. This invention provides for a walking/wading staff with a fully sized, integral fishnet.

Fishing whether onshore or in the water is a popular pastime that requires transporting multiple pieces of fishing gear to a desired fishing spot, usually at a location that is somewhat inconvenient for walking. In the course of arriving at that site, sportsmen traverse woods, sloped hills and ragged shores before finding their ideal fishing location, while usually wearing rubbery boots/footgear. On such travails, these sportsmen encounter uneven terrain with rocks and stones, riverbeds with hidden foot-catching crevices and slippery stream bottoms; any of which may cause them to lose balance and fall. There is a need for standard piece of fishing equipment that can double as a walking staff, so as not to burden fishermen with an extra piece of gear.

The net portions of the present invention are directionally distinct from those shown in Heritage U.S. Pat. No. 752,550. In Harris U.S. Pat. No. 1,258,632, a small "landing net", element 11, is depicted. The walking cane of Watterson U.S. Pat. No. 2,033,408 includes a pocket/bag for other sporting reasons.

Lee U.S. Pat. No. 7,269,921 describes a boat anchoring device for a fishing net. FIG. 1 of Lee shows and the specification (column 5 lines 5-67, column 6 lines 30-5 ; and column 8 lines 11-29) describes pins at both ends of a fishing net that are used as connectors so that the fishing net can be hung on anchoring devices. The pin connectors in Lee are configured to cooperate with and connect to boat anchoring connectors to enable the fishing net to be releasably connected to the boat anchoring device (claim 1). Nothing in Lee teaches or suggests that the pins are handles or can be used as handles to enable the fishing net to be used as a walking staff, or that the boat anchoring device can in any way be effective for supporting a person for the purpose of walking. The device in Lee does not solve the problem of needing a standard piece of fishing equipment that can double as a walking staff.

Several known fishing rod-walking cane configurations includes those in Edgerly U.S. Pat. No. 475,852; Lobit U.S. Pat. No. 849,481; Grandjean U.S. Pat. No. 1,972,518; Demetris U.S. Pat. No. 7,210,264 and Govero Pending application Ser. No. 11/681,476. Meanwhile, Kelley Pending application Ser. No. 09/776,866 focused on a particular "survival stick" for fly-fishing.

Telescopically extending or folding fishnets are the focus of Morseth U.S. Pat. No. 2,595,597; Gerritsen U.S. Pat. No. 4,050,177 and DePoe U.S. Pat. No. 6,032,399 while Needham U.S. Pat. No. 6,898,891 and Ericksen U.S. Pat. No. 5,628,538 showed hooks for fishing tools and/or wading staffs. Finally, Thomas U.S. Pat. No, 7,395,629 showed a combined fishing accessory with numerous elements, even an added light.

SUMMARY OF THE INVENTION

The present invention relates to a fishnet that can also be efficiently used as a walking/wading staff. The fishing net staff has the typical rounded frame that holds a full size, fully deployed (i.e., not retractable or foldable) fishnet and uses the traditional elongated "handle" as a support pole that may or may not be telescopically collapsible, or otherwise compactable. The improvement disclosed is that the proximal end of the frame is comprised of a handle specifically for the sportsmen to grip while using the support pole of the fishing net staff to brace themselves while walking, wading, or hiking on dry land trails to or from their favorite fishing site. It preferred that the support pole be compactable and more preferred that the support pole be telescopic. Being compactable allows the fishing net staff to be more easily stored on a person especially while wading in the water. The disclosed device may further include a hook extension for retrieving otherwise out-of-reach fishing lines and lures.

In a preferred embodiment of the embodiment of the fishing net staff, the pole has a structurally supportive telescopic design that includes a plurality of interconnecting elongated segments that move slidably in telescopic manner relative to one another from a first, fully compacted (or retracted) configuration, to an intermediate length, to a final, fully extended configuration. Preferably, these pole segments easily, yet temporarily interlock to one another after being slid into an extended use position so as to support a person who is using the fishing net staff as a walking or wading stick. It is not necessary to lock the segments together while in a retracted/compacted state. In fact, the opposite may be preferred. Segments that are locked together while compressed will slow down the speed at which these staffs may be deployed for safer walking/wading and/or extended fish catching.

The aforementioned staff may be made from one or more functional materials. Preferred versions are made from metal, i.e. aluminum or stainless steel. Alternate versions have staff sections made from carbon fiber, fiberglass or plastic. Fancier, more natural versions may have components made from hardwood or bamboo.

Preferably, the fishing net staff further includes an integral hook at or close to the staff's distal (bottom) end. When extended/extracted from the staff, this hook may be used to retrieve a badly cast fishing line or lure otherwise tangled in brush or trees beyond the fisherman's normal reach. It may also be used to gather in snagged hats, apparel or possibly small rafts and other equipment that has started to float/drift away. This hook may be integrally built into one staff segment and most preferably made fully (or at least partially) retractable so as to cause less interference with brush during transport.

BRIEF DESCRIPTION OF DRAWINGS

FIG. 3 is a front view of one embodiment of the fishing net staff with an un-segmented pole support and ergonomic hook shaped handle;

FIG. 4 is a front view of one embodiment of the fishing net staff with an un-segmented pole support and a non-aligned handle with a wrist/forearm rest;

FIG. 5a is a perspective view of one embodiment of the fishing net staff with a segmented pole support fully extended;

FIG. 5b is a perspective view of one embodiment of the fishing net staff with a segmented pole support with intermediate extension;

FIG. 5c is a perspective view of one embodiment of the fishing net staff with a segmented pole support fully retracted;

FIG. 6a is a perspective view of one embodiment of fishing net staff with a distally extending hook;

FIG. 7a is a preferred embodiment of a retractable hook in a closed position; and FIG. 7b is a preferred embodiment of a retractable hook in an opened position.

Figure 1:
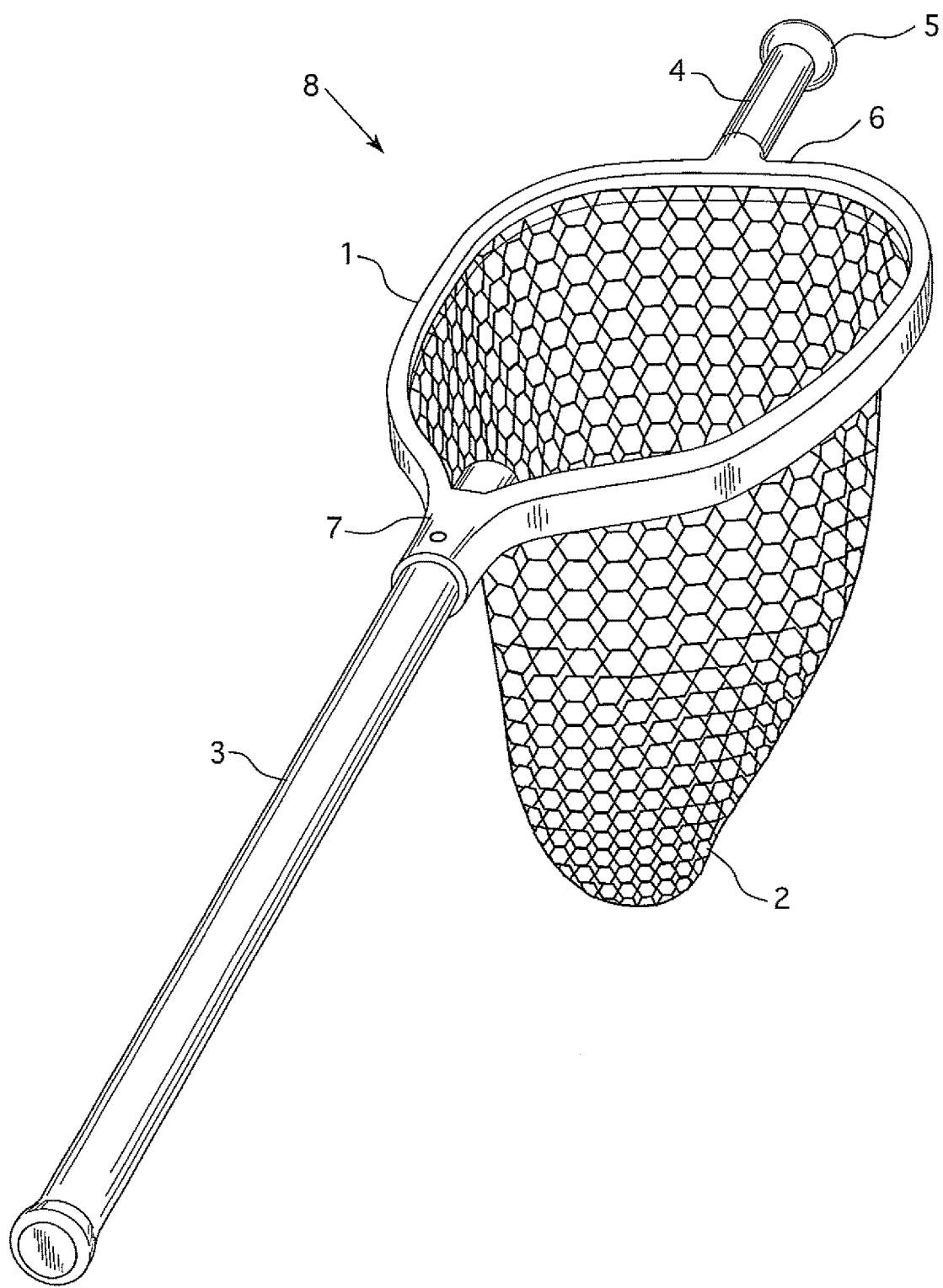
FIG. 1 is a perspective view of one embodiment of the fishing net staff with an un-segmented pole support and a rod shaped handle.

Further features, objectives and advantages of the present invention will become clearer when referring to the following detailed description made with reference to the drawings.

DETAILED DESCRIPTION OF PREFERRED EMBODIMENTS

The present invention solves a problem encountered by many fishermen during their day of sport/relaxation. While walking/wading through streams, ponds, marshes, swamps, and river or lake shores, they run into unseen perils including sharp rocks, litter and other foreign objects, tree branches, and surprise terrain drop-offs any of which may cause the fishermen to fall and risk serious bodily injury. Such perils may be averted by using a walking/wading staff for better balance. It may prove difficult, however, for one to carry his/her own tackle box, fishing rod/reel, netting and several other accessories while traversing to one's favorite fishing spot. The present invention alleviates these problems.

Disclosed is a fishing net device that can also function as a walking/wading staff. It comprises a handle situated over the fishing net on the side opposite of the traditional "handle" which doubly functions as a support pole. The handle can be any shape capable of being grasped by a human hand for effectuating the purpose of walking; for example the handle can be a rod shape, a billy club shape, or a bell fountain shape. Handle shapes that enable a person to easily and comfortably use the fishing net as a walking stick are contemplated by the invention. For example, the handle may also have a nub on top. The handle can also be an ergonomic shape such as a hook or Fritz handle. The handle may or may not have finger indentations. The handle may have grips or be textured. Though the handle can be placed anywhere on proximal end of frame, preferably the handle is placed centrally in direct alignment with the support pole. Alternatively, a non-centrally placed handle can be used. Either may be used with or without a wrist/forearm rest support.

Though the accompanying drawings show one preferred fishnet shape frame (i.e., teardrop), it should be understood that any other size and shape of a fishnet frame may be substituted for the frame as shown in the drawings. Likewise the invention contemplates using any style, length or depth of netting. The support pole for the present invention can be any non-compactable or compactable style as long as the fully extended pole length is in a range to be a useful walking/wading staff for adult humans. Some embodiments of a non-compactable style include a solid pole, a hollow pole, or a pole made of segments that can be twisted together and apart like many common pool cue sticks. However, it is preferable that pole be compactable and it is most preferred that the pole be telescopic. Having a compactable fishing net staff is preferred for easy storage on one's person or with one's fishing gear.

Another problem experienced by many fishermen, especially those who fly-fish or stream fish on foot, is line/lure snagging. When castings get caught on a branch a few feet above normal reaching level, a pole hook can become quite useful. Yet another problem for standing/wading sportsmen involves reach. A windblown hat, loose floating object, even small raft may be more easily retrieved with a pole hook. The hook is preferably a retractable hook located at the distal end of the pole support. Any way to retract the hook known in art is contemplated by invention. The hook can extend either in the distal direction or in a direction perpendicular (to the side of) to the support pole.

The examples set forth in the drawings show only some possibilities for present embodiments. After studying same, still further invention variations may be made clear.

Figure 2:
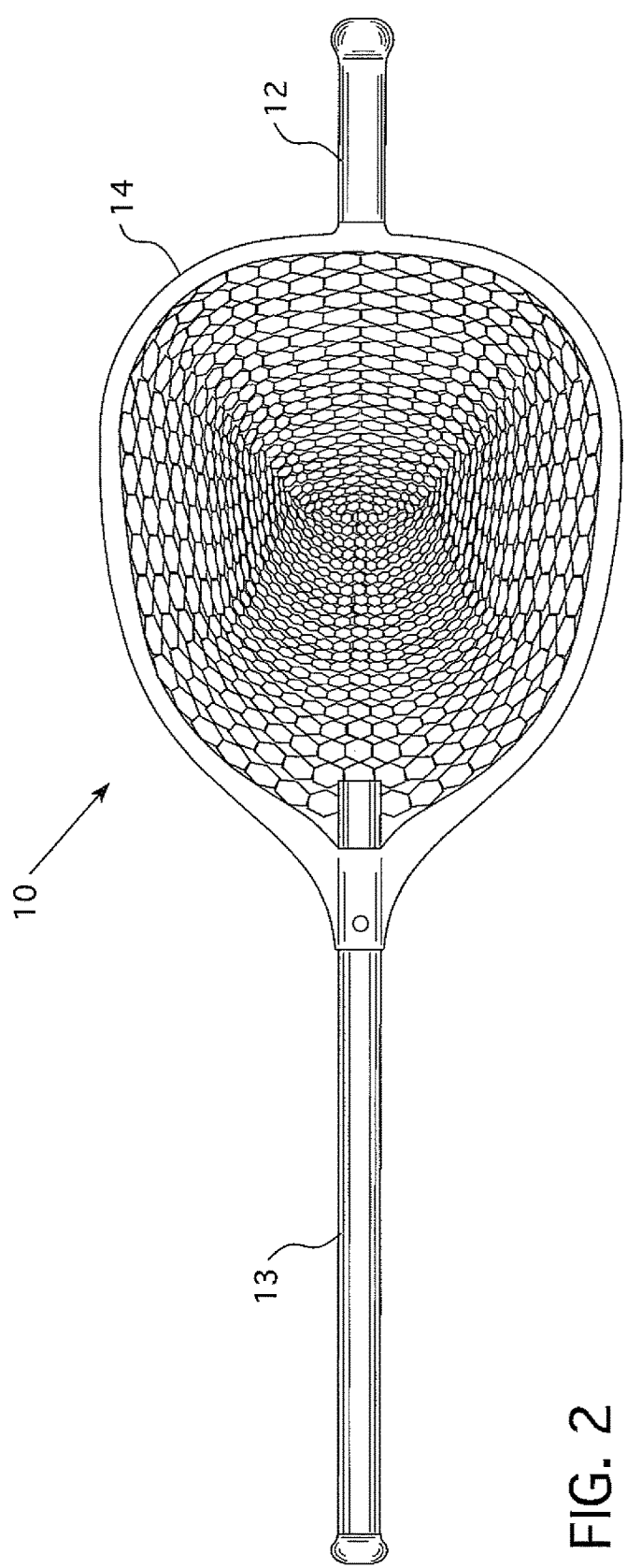
FIG. 2 is a front view of one embodiment of the fishing net staff with an un-segmented pole support directly aligned with handle.

In FIG. 1, an embodiment of the fishing net staff 8 is comprised on frame 1 which holds net 2. On the top or proximal portion 6 of frame 1 is connected handle 4 with nub S attached. On the bottom or distal portion 7 of frame 1 is un-segmented support pole 3. In FIG. 2 is depicted an embodiment of the fishing net staff 10 is depicted with handle 12 connected to frame 14 in direct alignment with un-segmented support pole 13 also connected to frame 14.

Handle and elongated support pole can be connected to fishnet frame via welding, melting, physical attachment (i.e. bolting) and/or strong adhesive depending on the materials selected for making respective components. Alternatively, the handle and elongated poles can be part of one piece contiguous piece with the frame. The fishing net staff should minimally measure about four feet; and more preferably between 48 to 60 inches in total length. The handle of the fishing net staff can be roughly 4 to 6 inches, in length and about 1 to 1.5 inches in diameter. However, to accommodate smaller sized hands, handles of less than 4 inches and smaller diameters are also contemplated by the invention.

FIGS. 3 and 4 depict fishing staff embodiments with different handle designs. FIG. 3 depicts an embodiment of the fishing net staff 15 with a handle 16 that is an ergonomic hook design. On the top or proximal portion 17 of frame 18 is connected handle 16. On the bottom or distal portion 19 of frame 18 is un-segmented support pole 11. FIG. 4 depicts a fishing net 20 staff with a handle 21 that is not directly aligned with the support pole 22. On the bottom or distal portion 23 of frame 24 is un-segmented support pole 22. On the top or proximal portion 26 of frame 24 is connected handle 21 located off to the side of the midline 27 of fishing net staff 20. Some embodiments of this design may further comprise wrist/forearm rest 28. The handles for fishing net staff can be any feasible design (such as the ones described above) that can be used for a walking /wading staff and are not limited to the ones depicted in these figures.

In a preferred embodiment of the embodiment of the fishing net staff, the pole has a structurally supportive telescopic design that includes a plurality of interconnecting elongated segments that move slidably in a telescopic manner relative to one another from a first, fully compacted (or retracted) configuration, to an intermediate length, to a final, fully extended configuration. For elongated telescopic poles, preferred embodiments include pole supports with three segments. FIG. 5 depicts one embodiment of a fishing net staff with a segmented support pole that telescopically retracts. In FIG. 5a, fully extended fishing staff 30 is comprised of frame 31 which holds net 32. On the top or proximal portion 33 of frame 31 is connected handle 34 with nub 35 attached. On the bottom or distal portion 36 of frame 31 is segmented support pole 37. Support pole 37 is comprised of bottom segment 38 which includes butt 39, middle segment 40, and top segment 41 which connects to the bottom or distal portion 36 of frame 31. To retract, bottom segment 38 first slides into middle segment 40 until it reaches the butt 39 to form combined segment 42. FIG. 5b shows this partial retraction. Then the combined segment 42 is pushed through top segment 41 over net 32 and is stopped by butt 39 as depicted in FIG. 5c.

It is preferred that the telescopic fishing net staff range between 48 to 60 inches in total length. When fully compacted onto itself, it is preferred that overall staff length range between about 20 to 30 inches. For a three-segmented support pole the bottom and middle segments should measure about 16 to 22 inches in length, and the top segment should measure about 3 to 9 inches in total length. If overall smaller, telescopic segments are preferred (for materials selection and rigidity reasons), depending on the size of respective segments, four or more segments/sections may be substituted.

Though not clearly visible in the accompanying drawings, adjacent staff segments maybe made to easily "lock" together using an orifice with a mated, spring-loaded ball. Alternate interconnecting means include spring-loaded pins and orifices, threaded lock rings and/or force fit, interlocking ends. Preferably, these pole segments easily, yet temporarily interlock to one another after being slid into an extended use position so as to support a person who is using the fishing net staff as a walking or a wading stick. It is not necessary to lock the segments together while in a retracted/compacted state. In fact, the opposite may be preferred. Segments that are locked together while compressed will slow down the speed at which these staffs may be deployed for safer walking/wading and/or extended fish catching.

In one preferred case, the staff proper is made from aluminum or stainless steel. Alternately, various components may be manufactured from polymers, polyvinyl chloride (PVC), high-density polyethylene (HDPE), polypropylene, nylon, steel, fiberglass carbon fiber or other composites. More "natural", aesthetic versions may have hardwood or bamboo components. The composition and the design of the fishing net staff should work together so that it can be structurally supportive to brace a person while walking over challenging terrain.

Figure 6B:
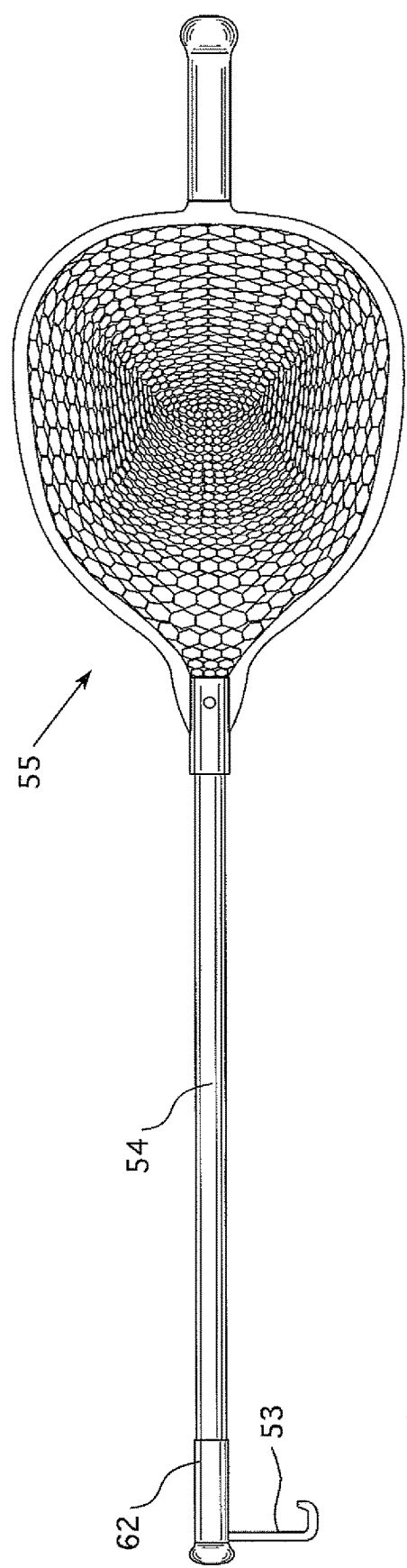
FIG. 6b is a front view of one embodiment of the fishing net staff with a perpendicular hook.

FIG. 6 depicts preferred embodiments of the fishing net staff with a hook on the distal end. A hook is useful for retrieving poorly cast fishing lines/lures, fishing gear/apparel or any other equipment that accidentally floats away while wading in the water. FIG. 6a shows an embodiment of fishing staff 50 with hook 51 positioned within butt 56 on support pole 60 extending distally. In distally extending hook embodiments, the hook needs be retractable so that the fishing net staff can effectively function as a walking stick. FIG. 7 shows a preferred retractable method/embodiment. In the closed position portrayed in FIG. 7a, connected to support pole 60 is butt 56 made up of cylinder 58 and nub 59, has opening 57 in which hook 51 rests and through which hook 51 can swing out into the distal position. In FIG. 7b hook 51 is in the open position extending distally from opening 57 in nub 59. The mechanism to swing out hook 51 can be a lever release mechanism, a spring release mechanism or any mechanism known in the art. Alternatively, the hook 53 may extend perpendicular to the support pole 54 from butt 62 as shown for fishing staff 55 in FIG. 6b. Preferably hook 53 is partially or fully retractable.

One object of this invention is to provide a new and improved walking staff-fishnet combination. Another provides a walking/wading/hiking staff with its own, fully sized, fully functional fly-fishing net. Yet another object is to provide a walker-fishnet combination that is relatively inexpensive to manufacture so that the consuming public (mostly sportsmen) will reap the reward of safer, strolling to and from one's favorite fly-fishing "spots".

A combined walking staff/net for fly-fishing enthusiasts has been described, While enhancing anyone's abilities to hike on rugged terrain, it most benefits those sportsmen susceptible to slipping and losing their firm footing when passing through cold running streams on their way to anchoring in said streams for repeated fly-fishing castings. While sportsmen wade in shallow waters to their preferred casting sites, the fishing net staff of this invention, when firmly held by its handle can help locate many underwater perils by feel.

The foregoing discussion discloses and describes merely exemplary embodiments of the present invention. One skilled in the art will readily recognize from the accompanying drawings and claims that various changes or modifications and variations can be made without departing from the spirit and scope of this invention. The described embodiments are to be considered in all respects only as illustrative and not restrictive. The present invention may be embodied in other specific forms without departing from its spirit or essential characteristics. Accordingly, it is not intended that the invention be limited except by the appended claims.

The invention claimed is:

1. A fishing net that is capable of serving as a walking staff, said fishing net comprising:
a net frame comprised of a proximal portion and a distal portion, a handle connected to the proximal portion of the net frame for effecting the purpose of walking; said handle being of a sufficient length such that said handle is capable of extending at least completely through a grip of a human hand formed with four fingers of the human hand wrapped generally parallel around the handle with the handle touching each of the four fingers; and an elongated support pole connected to the distal portion of the net frame.

2. The fishing net of claim 1 wherein the elongated support pole is compactable.

3. The fishing net of claim 1 wherein at least a portion of the elongated support pole extends and retracts telescopically.

4. The fishing net of claim 1 wherein the handle is an ergonomic hook.

5. The fishing net of claim 1, wherein the proximal portion of the net frame further comprises a wrist/forearm rest.

6. The fishing net of claim 1 wherein a distal end of the elongated support pole includes a retrieving hook.

7. The fishing net of claim 6 wherein the retrieving hook is fully retractable when not in use.

8. The fishing net of claim 7 wherein the retrieving hook extends in a distal direction from the elongated support pole.

9. The fishing net of claim 7 wherein the retrieving hook extends perpendicular to the elongated support pole.

10. The fishing net of claim 1 wherein the staff is made from a material selected from the group consisting of: carbon fiber, fiberglass, plastic, metal, composite and combinations thereof.

11. The fishing net of claim 1, which is further comprised of a hook retractably extending from the elongated support pole.

12. The fishing net of claim 1 wherein said elongated support pole is comprised of a plurality of lockable, telescopic segments, wherein the staff is at least 48-60 inches long when the elongated support pole is fully extended; and ranges in length between about 20-30 inches when the elongated support pole is fully retracted.

13. The fishing net of claim 1 wherein said handle is of sufficient longitudinal length and diameter such that said longitudinal length of said handle is adapted to pass completely across a grip created with a user's hand for effecting the purpose of walking without the user's hand grasping said net frame.

14. A fishing net/walking staff combination comprising:
a net having a proximal portion and a distal portion, an elongated support pole comprised of a distal end and a proximal end, said proximal end is connected to the distal portion of the net frame via a top segment, and a handle that can be grasped by a human hand and that is connected to the proximal portion of the net frame, the handle is used for gripping for effecting the purpose of walking; said handle cooperates with the net frame and elongated support pole to support a person when used as a walking staff, wherein the handle is rod-shaped and is further comprised of a nub having a diameter larger than a diameter of the handle and sharing a common centerline with the handle, wherein the elongated support pole is comprised of at least two retractable telescopic segments, wherein a first segment slides into a second segment to form a combined segment and the combined segment slides through the top segment of the distal portion of the net frame, whereby the staff is then fully retracted.

15. The fishing net/walking staff combination of claim 14 further comprised of a hook that retractably extends from the elongated support pole.

16. The fishing net/walking staff of claim 14 wherein a diameter of the handle is at least approximately one inch.

17. The fishing net/walking staff of claim 14 wherein said handle further comprises:
a terminal end adjacent the nub with a diameter greater than a primary diameter of said handle.

* * * * *